(12) United States Patent
Rommelfanger et al.

(10) Patent No.: US 12,311,861 B2
(45) Date of Patent: May 27, 2025

(54) IMPACT PROTECTION DEVICE AND METHOD FOR OPERATING AN IMPACT PROTECTION DEVICE

(71) Applicant: Dr. Ing. h.c. F. Porsche Aktiengesellschaft, Stuttgart (DE)

(72) Inventors: Christian Rommelfanger, Bad Liebenzell (DE); Philipp Bolay, Flacht (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/587,995

(22) Filed: Feb. 27, 2024

(65) Prior Publication Data

US 2024/0294136 A1    Sep. 5, 2024

(30) Foreign Application Priority Data

Mar. 2, 2023  (DE) .................... 10 2023 105 134.2

(51) Int. Cl.
- *B60R 21/20*  (2011.01)
- *B60K 35/22*  (2024.01)
- *B60K 35/70*  (2024.01)
- *B60R 21/231*  (2011.01)

(52) U.S. Cl.
CPC ............ *B60R 21/20* (2013.01); *B60K 35/223* (2024.01); *B60K 35/70* (2024.01); *B60K 2360/42* (2024.01); *B60R 2021/23107* (2013.01)

(58) Field of Classification Search
CPC .......... B60R 21/20; B60R 2021/23107; B60R 21/215; B60R 21/205; B60K 35/223; B60K 35/70; B60K 2360/42; B60K 35/00; B60K 2360/652
See application file for complete search history.

(56) References Cited

U.S. PATENT DOCUMENTS

| | | | | |
|---|---|---|---|---|
| 5,709,403 | A * | 1/1998 | Taguchi | B60R 21/01 280/732 |
| 11,046,279 | B2 * | 6/2021 | Rupp | B60R 21/233 |
| 11,865,914 | B2 * | 1/2024 | Ha | B62D 1/046 |

(Continued)

FOREIGN PATENT DOCUMENTS

| | | | | |
|---|---|---|---|---|
| WO | WO-0145080 A1 * | 6/2001 | | B60K 35/00 |
| WO | WO-2015041001 A1 * | 3/2015 | | B60R 11/0235 |

(Continued)

*Primary Examiner* — Drew J Brown
(74) *Attorney, Agent, or Firm* — LEYDIG, VOIT & MAYER, LTD.

(57) ABSTRACT

An impact protection device for an occupant of a motor vehicle in a vehicle interior, including a display device with a display, with which an airbag arrangement is associated, and at least one airbag, which is filled with gas and deploys when the impact protection device is activated. The display device includes a printed circuit board, which is arranged in a housing of the display device behind a display panel. The printed circuit board is combined with the display panel and the airbag arrangement arranged behind the printed circuit board in the housing, such that the printed circuit board with the display panel moves away from the housing when the impact protection device is activated.

16 Claims, 2 Drawing Sheets

(56) References Cited

U.S. PATENT DOCUMENTS

| | | | |
|---|---|---|---|
| 2012/0074674 A1* | 3/2012 | Ohoka | B60R 21/203 |
| | | | 345/1.3 |
| 2013/0009430 A1 | 1/2013 | Islam et al. | |
| 2020/0172037 A1* | 6/2020 | Klaenhammer | B60R 21/203 |
| 2021/0107552 A1 | 4/2021 | Ha et al. | |
| 2022/0332267 A1 | 10/2022 | Wu et al. | |

FOREIGN PATENT DOCUMENTS

| | | | |
|---|---|---|---|
| WO | WO 2021242558 A2 | 12/2021 | |
| WO | WO-2024118844 A1 * | 6/2024 | B32B 27/08 |

\* cited by examiner

IMPACT PROTECTION DEVICE AND METHOD FOR OPERATING AN IMPACT PROTECTION DEVICE

CROSS REFERENCE TO RELATED APPLICATIONS

This application claims benefit to German Patent Application No. DE 10 2023 105 134.2, filed on Mar. 2, 2023, which is hereby incorporated by reference herein.

FIELD

The invention relates to an impact protection device for an occupant of a motor vehicle in a vehicle interior. The invention further relates to a method for operating such an impact protection device in a motor vehicle.

BACKGROUND

The international publication WO 2021/242558 A2 discloses a flexible display panel with flexible articulation sections for use in an automotive interior, wherein the display panel is advantageously configured for a head impact. The American publication US 2022/0332267 A1 discloses a flexible display mounted on a device consisting of an airbag module and a filling unit, wherein the device and the display are fixedly connected to one another but can move relative to one another in an emergency. The American publication US 2021/0107552 A1 discloses a method and device for implementing a display in a front region of a steering wheel, taking into account an airbag in a moving object, for example in a vehicle, wherein the display is flexibly designed and displaceable relative to the steering wheel.

SUMMARY

In an embodiment, the present disclosure provides an impact protection device for an occupant of a motor vehicle in a vehicle interior, comprising a display device with a display, with which an airbag arrangement is associated, and at least one airbag, which is filled with gas and deploys when the impact protection device is activated. The display device includes a printed circuit board, which is arranged in a housing of the display device behind a display panel. The printed circuit board is combined with the display panel and the airbag arrangement arranged behind the printed circuit board in the housing, such that the printed circuit board with the display panel moves away from the housing when the impact protection device is activated.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
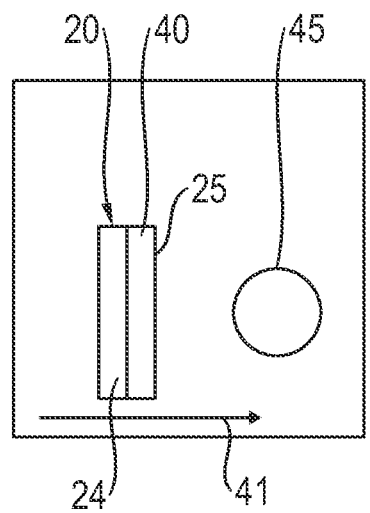
FIG. 1 illustrates a schematic illustration of a display device having a housing and a display unit as well as an airbag arrangement integrated into the display device together with a greatly simplified representation of the vehicle occupant at a time t0.

In an embodiment, the present invention provides improved occupant protection in motor vehicles.

An improved impact protection device for an occupant of a motor vehicle in a vehicle interior is provided, in which a display device with a display is arranged, with which an airbag arrangement is associated, which comprises at least one airbag, which is filled with gas and deploys when the impact protection device is activated, wherein the display device comprises a printed circuit board, which is arranged in a housing of the display device behind a display panel, such that the printed circuit board is combined with the display panel and the airbag arrangement arranged behind the printed circuit board in the housing, such that the printed circuit board with the display panel moves away from the housing when the impact protection device is activated. With regards to the printed circuit board, "behind" means that the printed circuit board is arranged inside the housing. The display panel is provided on the outside of the housing and represents the display. An imaging film can be arranged between the display panel and the printed circuit board. If an accident is detected during in operation of the motor vehicle equipped with the impact protection device, the impact protection device is automatically activated. In this case, the printed circuit board with the display panel is accelerated a defined path in the direction of the occupant, in particular the head of the occupant, by the activated airbag arrangement. The displacement is limited, for example to a few centimeters, and advantageously serves to increase the deformation space available to the occupant in the event of an accident.

A preferred exemplary embodiment of the impact protection device is characterized in that the printed circuit board is designed to be flexible enough to deform in the event of an occupant impact. The deliberately designed deformation of the printed circuit board can further advantageously reduce the risk of injury in the event of an occupant impact, in particular head impact.

A preferred exemplary embodiment of the impact protection device is characterized in that the printed circuit board is provided with predetermined breakpoints, which cause a defined breakage of the printed circuit board into printed circuit board fragments when the impact protection device is activated. Additional design effort is deliberately taken to increase safety during operation of the vehicle, in particular in the event of an accident. The predetermined breakpoints are introduced into the printed circuit board using an etching method, for example.

A preferred exemplary embodiment of the impact protection device is characterized in that the airbag arrangement comprises airbags, each of which is associated with at least one printed circuit board fragment. Here too, the increased design effort is deliberately taken in order to further increase safety in the operation of the motor vehicle. Depending on the design of the printed circuit board, individual airbags can also be assigned to several printed circuit board fragments.

A preferred exemplary embodiment of the impact protection device is characterized in that the airbag arrangement is combined with a mechanical structure, which causes a defined breakage of the printed circuit board into printed circuit board fragments when the impact protection device is activated. The mechanical structure can comprise tappets that engage at the breakpoints of the printed circuit board. The mechanical structure can also comprise separating elements, such as separating walls, through which a multi-chamber system for the airbag arrangement is represented.

A preferred exemplary embodiment of the impact protection device is characterized in that the airbag arrangement comprises a multi-chamber system. The multi-chamber system simplifies the association between the airbags and the printed circuit board fragments significantly.

A preferred exemplary embodiment of the impact protection device is characterized in that the display panel is designed and arranged to be flexible enough to deform together with the printed circuit board in the event of an occupant impact. This can further reduce the risk of injury in an accident, especially a head impact.

A preferred exemplary embodiment of the impact protection device is characterized in that the display panel is connected to the housing together with the printed circuit board by a safety catch. This safely prevents individual parts of the display device flying around when the impact protection device is activated, in particular printed circuit board fragments flying around in an undesirable manner. The safety catch comprises straps, for example, with the aid of which straps the display panel is connected to the housing together with the printed circuit board or the printed circuit board fragments.

An embodiment of the invention optionally also relates to a motor vehicle having an airbag arrangement as described hereinabove.

In a method for operating a previously described impact protection device in a motor vehicle, the above objective is alternatively or additionally solved in that the printed circuit board with the display panel moves away from the housing when the impact protection device is activated. In this way, the deformation space provided in the event of an accident can be effectively increased by relatively simple means.

An embodiment of the invention further relates to a printed circuit board, a display panel, an airbag arrangement, an airbag, a display device, a display and/or a housing for a previously described impact protection device. The specified parts can be purchased separately. An embodiment of the invention optionally also relates to a display device with a previously described impact protection device.

Further advantages, features, and details of embodiments of the invention arise from the following description, in which various exemplary embodiments of the invention are individually described in detail with reference to the drawings.

Figure 2:
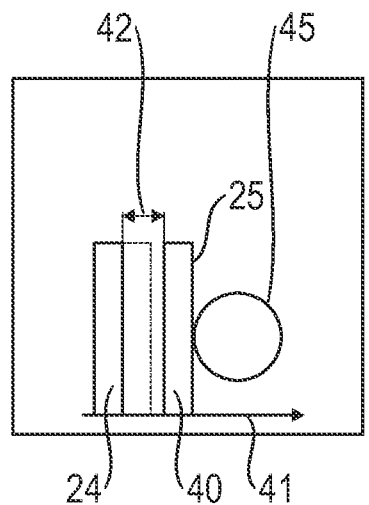
FIG. 2 shows the display device of FIG. 1 at a time point t1.
Figure 3:
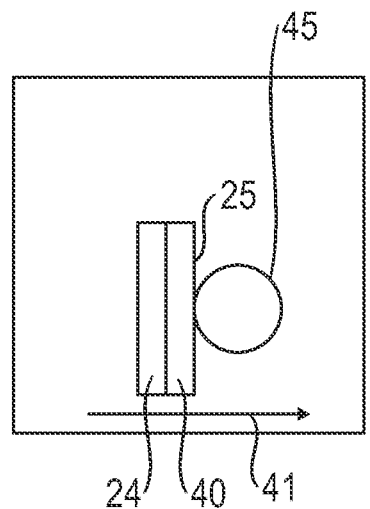
FIG. 3 shows the display device of FIG. 1 at a time t2.

FIGS. 1 to 3 schematically show a display device 20 having a display unit 40 and a housing 24. For example, the display unit 40 comprises a display panel and a printed circuit board. An imaging film can be arranged between the display panel and the printed circuit board. An airbag arrangement is integrated in the display device 20.

An arrow 41 indicates a path axis. A circle 45 indicates an occupant, in particular a head of an occupant, in a vehicle interior of a motor vehicle.

FIG. 1 shows that the occupant head 45 is arranged at a distance to a display 25 on the display unit 40 of the display device 20 at a time t0. The display unit 40 is slightly accelerated towards the head 45 at time t0 when an accident is detected.

The displacement of the display unit 40 along the path axis 41 ends at a time t1 shown in FIG. 2. An arrow 42 indicates the path that the display unit 40 traversed along the path axis 41.

The axial displacement of the display unit 40 increases the deformation space, which can be shown with the display device 20. The distance between the occupant head 45 and the display 25 of the display device 20 is significantly reduced in FIG. 2 compared to FIG. 1. FIG. 3 shows a time t2 after an intrusion of the occupant head 45.

Figure 4:
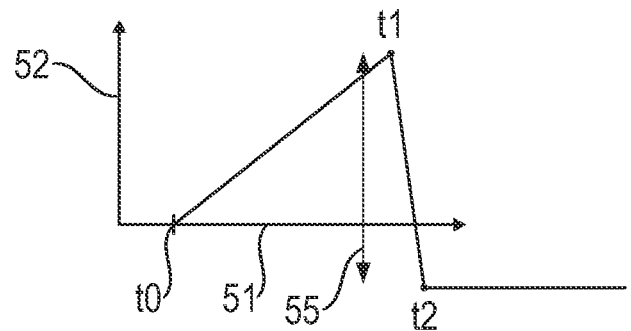
FIG. 4 shows a Cartesian coordinate diagram in which a path of the display unit from FIGS. 1 to 3 is plotted relative to the housing of the display device over time.

FIG. 4 shows a Cartesian coordinate diagram with an x-axis 51 and a y-axis 52. On the x-axis 51, a time t is plotted in a suitable unit of time, for example in seconds. The time points t0, t1 and t2 are drawn in the coordinate diagram. On the y-axis 52, a path along the path axis 41 is plotted in FIGS. 1 to 3 in a suitable unit, such as millimeters. A double arrow 55 corresponds to the path 42 in FIG. 2.

Figures 5, 6:
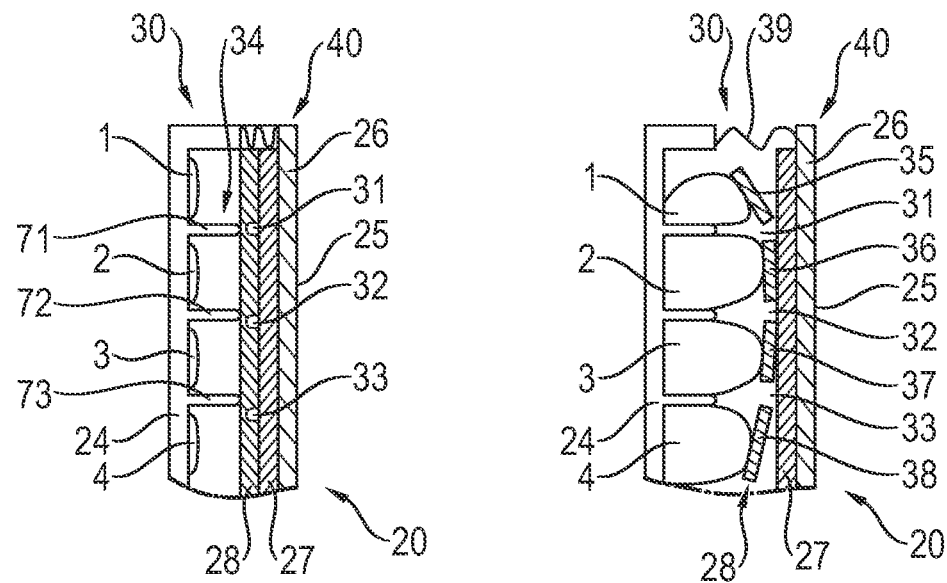
FIG. 5 shows a sectional view of an impact protection device having a display device in which an airbag arrangement is integrated, in an unactivated state.
FIG. 6 shows the impact protection device of FIG. 5 in the activated state.

FIGS. 5 and 6 shows a sectional view of an exemplary embodiment of the display device 20 with the display 25 and with an impact protection device 30 integrated in the display device 20. FIG. 5 shows the display device 20 with the impact protection device 30 in an unactivated state. FIG. 6 shows the display device 20 with the impact protection device 30 in the activated state.

The impact protection device 30 integrated in the display device 20 comprises an airbag arrangement 15 with four visible airbags 1, 2, 3, 4, in the section shown. The airbags 1 to 4 of the airbag arrangement 15 are combined in the housing 24 on a rear wall with a gas generator. With the gas generator, the airbags 1 to 4 can be inflated as needed when an accident is detected, as can be seen in an overall view of FIGS. 5 and 6.

The display 25 of the display device 20 is shown with the aid of a display panel 26. The display panel 26 is combined with an optional imaging film 27 and a printed circuit board 28 in the display unit 40. In the exemplary embodiment shown, the printed circuit board 28 is designed with predetermined breakpoints 31, 32, 33.

The impact protection device 30 includes a mechanical elements 34 suitable for breaking the printed circuit board 28 at the predetermined breakpoints 31, 32, 33 when the airbag arrangement 15 is activated.

The mechanical structure 34 includes three structural members 71, 72, 73 associated with the predetermined breakpoints 31, 32, 33. The structural elements 71 to 73 are designed, for example, as tappets or as separating walls of the airbag arrangement 15 which is designed as a multi-chamber system.

The display panel 26 of the display unit 40 is held on the housing 24 by means of a safety catch 39. For example, the safety catch 39 comprises elastic straps that prevent individual parts of the display unit 40, in particular, printed circuit board fragments 35, 36, 37, 38 of the printed circuit board 28 broken at the predetermined breakpoints 31, 32, 33 when the airbag arrangement 15 is activated, from flying around uncontrollably in the vehicle interior.

In the event of an accident that is detected by a suitable sensor device during operation of the motor vehicle, the airbag arrangement 15 of the impact protection device 30 is activated in the display device 20. The airbags 1 to 4 are inflated with suitable propellants, as can be seen in FIG. 6. The display unit 40 with the printed circuit board 28 then moves to the right in a desired manner from the rear wall of the housing 24 in FIG. 6. The printed circuit board 28 breaks at the predetermined breakpoints 31 to 33.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

1 Airbag
2 Airbag
3 Airbag
4 Airbag
15 Airbag arrangement
20 Display device
24 Housing
25 Display
26 Display panel
27 Imaging film
28 Printed circuit board
30 Impact protection device
31 Predetermined breakpoint
32 Predetermined breakpoint
33 Predetermined breakpoint
34 Mechanical structure
35 Printed circuit board fragments
36 Printed circuit board fragments
37 Printed circuit board fragments
38 Printed circuit board fragments
39 Safety catch
40 Display unit
41 Path axis
42 Path
51 x-axis
52 y-axis
55 Double arrow
71 Structural element
72 Structural element
73 Structural element

The invention claimed is:

1. An impact protection device for an occupant of a motor vehicle in a vehicle interior, comprising:
   a display device with a display, with which an airbag arrangement is associated;
   at least one airbag, which is filled with gas and deploys when the impact protection device is activated,
   wherein the display device includes a printed circuit board, which is arranged in a housing of the display device behind a display panel,
   wherein the printed circuit board is combined with the display panel and the airbag arrangement arranged behind the printed circuit board in the housing, such that the printed circuit board with the display panel moves away from the housing when the impact protection device is activated, and
   wherein the printed circuit board is provided with predetermined breakpoints that cause a defined breakage of the printed circuit board into printed circuit board fragments when the impact protection device is activated.

2. The impact protection device according to claim 1, wherein the printed circuit board is flexible to deform in an event of an occupant impact.

3. The impact protection device according to claim 1, wherein the airbag arrangement comprises airbags to each of which one printed circuit board fragment is assigned.

4. The impact protection device according to claim 1, wherein the airbag arrangement is combined with a mechanical structure of the printed circuit board causing the defined breakage of the printed circuit board into printed circuit board fragments when the impact protection device is activated.

5. The impact protection device according to claim 1, wherein the airbag arrangement comprises a multi-chamber system.

6. The impact protection device according to claim 1, wherein the display panel is configured and arranged to be flexible to deform together with the printed circuit board in an event of an occupant impact.

7. The impact protection device according to claim 1, wherein the display panel is connected to the housing together with the printed circuit board by a safety catch.

8. A method for operating the impact protection device according to claim 1 in a motor vehicle, comprising:
   moving the printed circuit board away from the housing with the display panel when the impact protection device is activated.

9. The impact protection device according to claim 7, wherein the safety catch is configured to contain loose fragments of the printed circuit board between the housing and the display panel and/or contain other loose fragments between the housing and the display panel.

10. The impact protection device according to claim 7, wherein the safety catch comprises straps connecting the display panel to the housing configured to contain loose fragments of the printed circuit board between the housing and the display panel and/or contain other loose fragments between the housing and the display panel.

11. The printed circuit board, display panel, airbag arrangement, airbag, display device, display, and/or housing for the impact protection device according to claim 1.

12. An impact protection device for an occupant of a motor vehicle in a vehicle interior, comprising:
   a display device with a display, with which an airbag arrangement is associated;
   at least one airbag, which is filled with gas and deploys when the impact protection device is activated, wherein the display device includes a printed circuit board, which is arranged in a housing of the display device behind a display panel, wherein the printed circuit board is combined with the display panel and the airbag arrangement arranged behind the printed circuit board in the housing, such that the printed circuit board with the display panel moves away from the housing when the impact protection device is activated;

wherein the display panel is connected to the housing together with the printed circuit board by a safety catch.

13. The impact protection device according to claim 12, wherein the safety catch is configured to contain loose fragments of the printed circuit board between the housing and the display panel and/or contain other loose fragments between the housing and the display panel.

14. The impact protection device according to claim 12, wherein the safety catch comprises straps connecting the display panel to the housing configured to contain loose fragments of the printed circuit board between the housing and the display panel and/or contain other loose fragments between the housing and the display panel.

15. The impact protection device according to claim 14, wherein the straps are comprised of elastic.

16. A method for operating the impact protection device according to claim 12 in a motor vehicle, the impact protection device creating a first deformation space available to the occupant in the event of an accident, the method comprising:

moving the printed circuit board away from the housing with the display panel upon the impact protection device being activated such that a second deformation space is created, the second deformation space being greater than the first deformation space.

\* \* \* \* \*